United States Patent [19]

McCormick

[11] 3,925,901

[45] Dec. 16, 1975

[54] SYSTEM FOR MEASURING GROWTH AND HEALTH CHARACTERISTICS

[76] Inventor: James B. McCormick, 9950 W. Lawrence Ave., Schiller Park, Ill. 60176

[22] Filed: Aug. 16, 1973

[21] Appl. No.: 388,767

[52] U.S. Cl. ............................ 33/137 R; 33/174 D
[51] Int. Cl.² ..................... G01B 3/10; A61B 5/10
[58] Field of Search ................... 33/137, 138, 174 D

[56] References Cited
UNITED STATES PATENTS
| | | | |
|---|---|---|---|
| 1,029,767 | 6/1912 | Remington | 33/137 R |
| 2,581,858 | 1/1952 | Hilt et al. | 33/137 R |
| 3,336,674 | 8/1967 | Higgins et al. | 33/137 R |

FOREIGN PATENTS OR APPLICATIONS
| | | | |
|---|---|---|---|
| 836,485 | 4/1952 | Germany | 33/174 D |

*Primary Examiner*—William D. Martin, Jr.
*Assistant Examiner*—Steven L. Stephan
*Attorney, Agent, or Firm*—Fitch, Even, Tabin & Luedeka

[57] ABSTRACT

A system is disclosed for use in measuring growth and health characteristics wherein first and second generally flat plate-like elements are selectively interconnectable by an elongated measuring means and are manipulatable to measure such characteristics as one's height, blowing capacity and body flexion.

3 Claims, 6 Drawing Figures

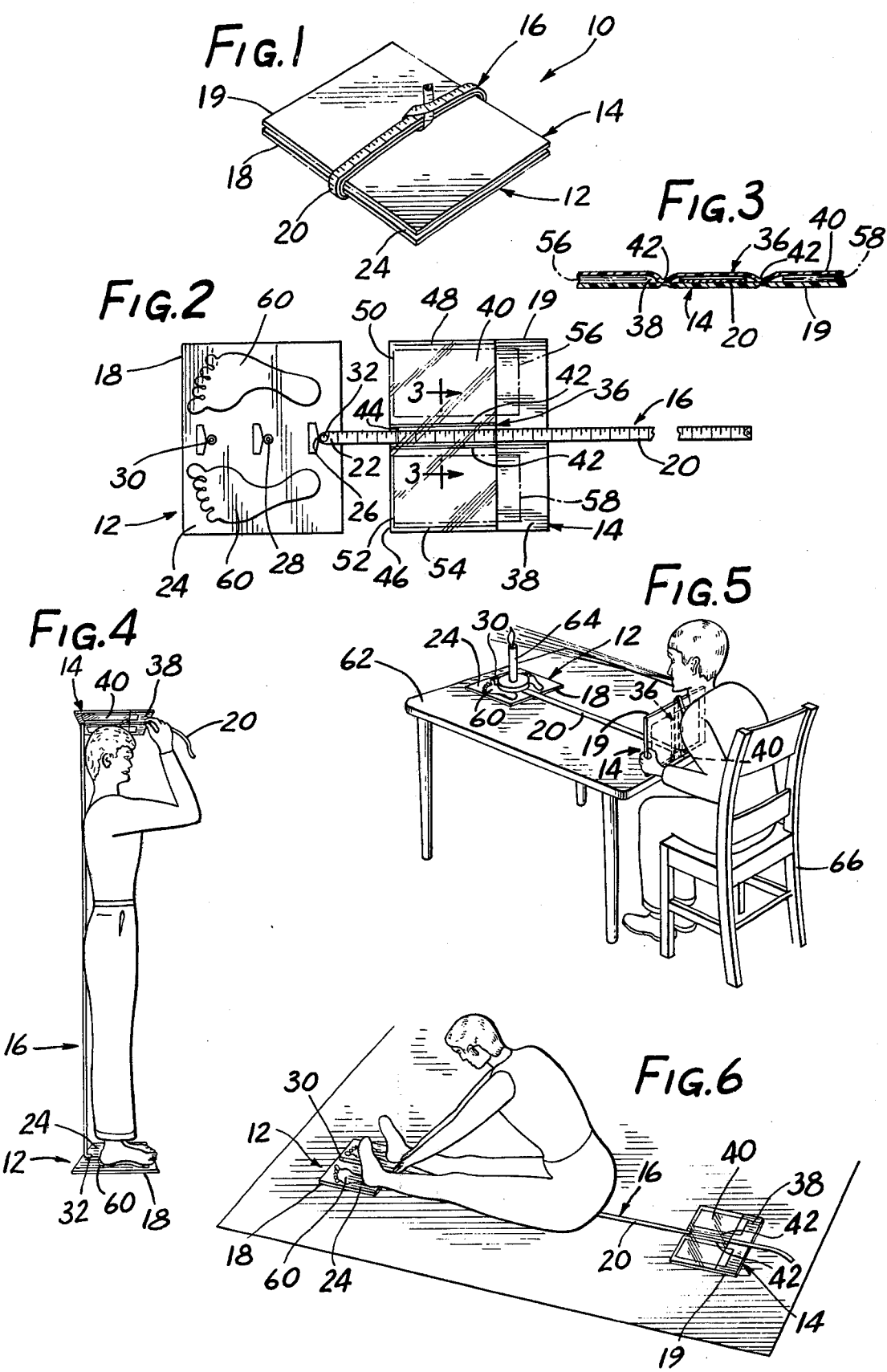

SYSTEM FOR MEASURING GROWTH AND HEALTH CHARACTERISTICS

The present invention relates generally to systems for measuring growth and health characteristics, and more particularly, to such a system which may be readily manipulated by an individual to measure such characteristics as height, blowing capacity and flexion.

Measurement of body growth, such as height, and physical capacities, such as blowing strength and flexion, provide a measure of one's physical condition and often result in improved mental health and well being. Frequently, when a person is striving to achieve weight reduction and/or cardiovascular improvement, measurements of his physical characteristics, such as waist measurement and blowing capacity, provide a continuing indication of the progress being achieved. The present invention provides a system for measuring growth and health characteristics in a relatively simple and efficient manner.

One of the primary objects of the present invention is to provide a system for measuring a person's growth and health characteristics in a simple manner, which system employs relatively inexpensive elements which lend themselves to highly efficient operation.

Another object of the present invention is to provide a system for use in measuring growth and health characteristics wherein an elongated measuring means is selectively attachable between first and second generally flat plate-like elements which are manipulatable to allow relatively exacting measurement between a point of attachment of the measuring means to one of the elements and a registration marking on the other element when positioned in engagement with a part of the person's body, such as for measuring height, or when positioned to provide a measurement of the distance a person is able to flex his body such as in bending at the waist while in a sitting position with legs outstretched.

Still another object of the present invention is to provide a system for use in measuring growth and health characteristics which is compact in construction and includes means for maintaining records of growth and health characteristics.

Further objects and advantages of the present invention, together with the organization and manner of operation thereof, will become apparent from the following detailed description of the invention when taken in conjunction with the accompanying drawing wherein like reference numerals designate like elements throughout the several views and wherein:

FIG. 1 is a perspective view of a system for measuring growth and health characteristics in accordance with the present invention, the elements of the system being secured together in a compact non-use position;

FIG. 2 is an enlarged plan view illustrating the first and second plate-like elements and the interconnecting measuring tape means disposed in open generally side-by-side relation;

FIG. 3 is an enlarged partial sectional view taken substantially along the line 3—3 of FIG. 2;

FIG. 4 is a side elevational view illustrating use of the system in accordance with the present invention for measuring a person's height;

FIG. 5 is a perspective view illustrating use of the system to measure blowing capacity; and FIG. 6 is a perspective view illustrating use of the system to measure waist flexion.

Referring now to the drawing, and in particular to FIG. 1, an apparatus or system for use in measuring a person's growth and health characteristics and the like in accordance with the present invention is indicated generally at 10. The system 10 finds particular application in the measurement of a person's height, blowing capacity or strength, and flexion, as well as maintaining a compact means for maintaining records of periodic measurements of one's growth and health characteristics. Numerous applications of the system 10 in accordance with the present invention will be described hereinbelow. However, other uses and adaptations of the system 10 in measuring growth and health characteristics will become apparent from the following detailed description.

The system 10 includes first generally planar plate-like element means, indicated generally at 12, second generally planar plate-like element means, indicated generally at 14, and elongated measuring means, indicated generally at 16. The first and second plate-like element means 12 and 14, respectively, are generally identical in plan configuration and thickness, and each comprises a relatively stiff, flat, lightweight rectangularly shaped element or member, indicated at 18 and 19, respectively, which may be made of a relatively stiff sheet material, such as cardboard, having vinyl plastic sheet coverings on the opposite sides thereof. The vinyl sheet coverings are suitably secured together about their peripheral edges, as by heat sealing, to totally enclose the associated inner cardboard sheets. The vinyl exterior surfaces on the members 18 and 19 provide durable, readily cleanable and relatively soft smooth exterior surfaces for the first and second plate-like element means 12 and 14, respectively. It will be understood that the first and second element means 12 and 14 may alternatively be constructed of other suitable materials. The first and second plate-like element means 12 and 14 are adapted to be placed in generally flat positions on a floor surface or the like.

The elongated measuring means 16 may comprise a conventional flexible tape measure 20 made from a fabric or suitable strength paper material or the like, and has one end portion 22 adapted to be releasably attached to an upper surface 24 of the first flat member 18, as considered in FIG. 2. To this end, the member 18 has fastening means thereon comprising three male portions 26, 28 and 30 of conventional fastening snaps secured to the upper surface 24 of member 18. The male fastening snap portions 26, 28 and 30 are spaced apart along a line coincident with the minor axis of the rectangularly shaped member 18, as considered in FIG. 2. The end portion 22 of the measuring tape 20 has a female portion 32 of a conventional snap fastener thereon adapted to be releasably coupled to either of the male snap fastener portions 26, 28 or 30 in a known manner.

The measuring tape 20 has dimensional indicia along its longitudinal length which begins with "0" at the fastening snap 32 and increases in magnitude in the direction away from the fastening snap 32. The dimensional indicia on the measuring tape 20 may be in accordance with the United States system of measurement or the metric system. When using the U.S. system of measurement, the standard inch markings are preferably further subdivided into ¼ or ⅛ inch divisions as desired.

The measuring tape 20 is cooperable with the second plate-like element means 14 in a manner to provide an indication of the distance between the second element means 14 and the first element means 12 during the measuring procedures to be outlined hereinbelow. To this end, the second flat member 19 includes guide means, indicated generally at 36, disposed on an upper surface 38 of the member 19. The guide means 36 comprises a generally tunnel-like channel which is disposed on the minor transverse axis of member 19 and is defined by a transparent plastic sheet 40 secured, as by heat sealing, to the upper surface 38 of the member 19 along transverse seal lines indicated by the dash lines 42. The opposite ends of the channel thus defined are open such that the measuring tape 20 may be received in sliding relation through the channel to allow movement of the member 19 along the length of the measuring tape. An edge surface 44 of the transparent sheet 40 is disposed close to an edge 46 of the member 19 and serves as a registration means such that a dimensional marking on the measuring tape 20 disposed immediately below the edge 44 may be read to provide a measurement of the distance between the second element means 14 and the attachment of the end 22 of the measuring tape to the first plate means 12.

The transparent sheet 40 extends laterally outwardly from both edges of the channel defined between the seal lines 42 and is secured as by heat sealing to the upper surface 38 of the member 19 along edge surfaces 48, 50, 52 and 54 to provide pockets on the member 19. The pockets so defined by the sheet 40 may be employed to receive an instructional manual, such as indicated in phantom at 56, and a record keeping notebook, such as indicated in phantom at 58.

With reference to FIG. 2, taken in conjunction with FIG. 4, the upper surface 24 of the first flat member 18 has a pair of footprints 60 thereon. The rearward edges of the heel portions of the footprints 60 lie on a line which is parallel to the longitudinal axis of the rectangularly shaped member 18 and passes substantially through the center of the male fastening snap 26. To measure a person's height, the fastening snap 32 on the end 22 of the measuring tape 20 is secured to the fastener 26 on the member 18, and the first plate member 18 is positioned on a generally flat floor surface or the like with the surface 24 facing upwardly. The person whose height is to be measured then stands on the first member 18 with his feet in registration with the footprints 60. The second plate member 19 is then moved along the length of the measuring tape 20 and is positioned so that the surface 38 engages the top of the person's head and lies substantially in a horizontal plane. With the first and second members 18 and 19, respectively, thus positioned in engagement with the person's feet and head, the measuring tape 20 is drawn relatively taut through the guide means 36. Thereafter, the dimensional indicia underlying the edge 44 of the guide means 36 may be read which provides an indication of the person's height. This information may then be recorded in the recording pamphlet or notebook 58.

The male fastening snap 28 is secured to the upper surface 24 of the plate member 18 generally centrally thereof and is employed when measuring a person's blowing strength or capacity. The measurement of blowing strength provides an indication of lung capacity and respiratory strength and thereby provides a measure of respiratory system improvement during a continued period of exercises designed to improve lung capacity and the like. With reference to FIG. 5, the first plate member 18 is placed on a table, such as indicated at 62, with the surface 24 facing upwardly. The female snap fastener 32 on the end 22 of the measuring tape 20 is secured to the male fastener 28. A candle 64 of conventional size is positioned on the upper surface 24 of the plate member 12 such that its longitudinal axis substantially coincides with a vertical line passing centrally through the male fastener 28. The person testing his blowing strength seats himself on a chair, such as indicated at 66, and holds the second plate member 19 in his hands so that the second plate member lies substantially in a vertical plane with its bottom edge engaging the table top. The measuring tape 20, which has previously been pulled through the guide channel means 36 on the second plate member in a direction to allow such positioning, is then drawn through the channel 36 so as to be relatively taut between the plate members 18 and 19.

With the plate member 19 positioned such that it is disposed at a position wherein the lower registration edge 44 of the guide means 36 generally overlies the 36-inch dimensional marking on the measuring tape 20, the candle 64 is lighted. The person being tested then positions his head such that his mouth is positioned at the upper edge of the second plate member 19 and forms his lips as if to pronounce the sound "O." He then inhales deeply and attempts to blow out the candle. If the attempt should fail, the first plate member 18 and associated candle 64 are drawn slightly toward the person by drawing the tape measure 20 toward the person through the guide channel 36, and a second attempt is made to blow the candle out. This adjustment is repeated, if necessary, until the person succeeds in just blowing the candle out, at which time the distance from the mouth to the candle may be determined by noting the dimensional indicia underlying the registration edge 44 of the guide means 36. This data may also be recorded in the recording notebook 58. Subsequent tests of this nature will provide an indication of the ability of the person to blow out the candle at progressively greater distances over a period of time during which lung capacity improvement exercises are practiced.

With reference to FIG. 6, the system 10 in accordance with the present invention also facilitates the measure of flexion, particularly at one's waist. To facilitate this measurement, the male snap fastener 30 is positioned on the upper surface 24 of the member 18 toward the left-hand edge thereof, as considered in FIG. 2. The snap fastener 32 on the end 22 of the tape measure 20 is then secured to the snap fastener 30 and the member 18 is positioned on a generally flat surface such as a floor or the like with the surface 24 facing upwardly. The second member 19 is then drawn away from the member 18 along the length of the tape measure 20 and is laid on the floor surface with its surface 38 facing upwardly and with the tape measure generally perpendicular to the edge 46 of the second member 19. The person making the measurement of flexion then sits on the tape with his heels overlying the heel portions of the footprints 60 on the plate member 18 such that the 6-inch dimension on the measuring tape 20 lies on an imaginary line connecting the bottoms of the person's heels. The person then bends forwardly and "walks" his fingers along the tape in the direction of the fastening member 30. By forward bending at the waist and "walking" his fingers toward the end 22 of the tape 20 secured to the plate member 18 until further flexion at the waist can no longer be accomplished, the lowest dimensional number on the tape 20 touched by the person's fingers provides an indication of relative flexion which may be recorded in the recording notebook 58. Subsequent flexion tests and measurements should, through exercise, indicate relative improvement in the flexion measurement by showing a decrease in the magnitude of the dimensional number on the tape 20 that the person is able to touch.

The words "height," "blowing" and "flexion" may be imprinted on the upper surface 24 of the first member 12 adjacent the fastening snaps 26, 28 and 30, respectively, to assist in proper connection of the end 22 of the measuring tape 20 to the member 18 during the various measurements described hereinabove.

After making the measurements as aforedescribed with respect to FIGS. 4, 5 and 6, the measuring tape 20 may be removed from the first and second plate members 18 and 19, respectively, and used to make a waist measurement which will also provide an indication of weight loss as in an exercise program established to reduce one's weight or otherwise firm up the stomach.

Following use of the system 10 to make the desired measurements as aforedescribed, the end 22 of the measuring tape 20 may be secured to the fastener snap 26 and the outer end of the tape inserted through the guide means 36 of the second plate member 19. The plate members 18 and 19 may then be placed in side-by-side relation and the outer loose end of the measuring tape 20 wrapped around the plate members to retain them in a generally fixed compact relationship, as shown in FIG. 1, with the instructional booklet 56 and record book 58 disposed within their respective receiving pockets defined by the sheet 40 in cooperation with the plate member 19.

Thus, it can be seen that the system 10 of the present invention provides a compact system for making measurements indicative of changes in growth and health characteristics of an individual which is relatively inexpensive to manufacture, easy to operate, and which compactly facilitates storage of instructional and record booklets.

While a preferred embodiment of the present invention has been illustrated and described, it will be obvious to those skilled in the art that changes and modifications may be made therein without departing from the invention in its broader aspects. Various features of the invention are defined in the following claims.

What is claimed is:

1. A system for use in measuring growth and health characteristics and the like, comprising, in combination, a first generally flat plate member adapted to be placed in a generally flat position on a floor surface or the like, an elongated flexible tape having one end attachable to said first plate member and having dimensional indicia therealong increasing in magnitude from said end attachable to said first plate member, and a second generally flat plate member having guide means thereon cooperable with said elongated measuring tape in a manner to facilitate movement of said second plate member along the length of said measuring tape, said guide means defining registration means cooperable with said measuring tape to indicate the distance between said second plate member and the point of attachment of said one end of said measuring tape to said first plate member, said first plate member having a first fastening means thereon to which said one end of said measuring tape may be attached for use when measuring a person's height, said first plate member having a second fastening means thereon to which said one end of said measuring means may be attached for use when measuring a person's blowing strength, said first plate member having a third fastening means thereon to which said one end of said measuring tape may be attached for use when measuring a person's flexion at the waist.

2. A system for use in measuring growth and health characteristics and the like, comprising, in combination, a first generally flat plate member adapted to be placed in a generally flat position on a horizontal surface, an elongated flexible measuring tape having fastening means on an end attachable to said first plate member and having dimensional indicia therealong increasing in magnitude from said end attachable to said first plate member, and a second generally flat plate member having guide means thereon cooperable with said elongated measuring tape in a manner to facilitate movement of said second plate member along the length of said measuring tape, said guide means defining registration means cooperable with said measuring tape to indicate the distance between said second plate member and the point of attachment of said one end of said measuring tape to said first plate member, said first and second plate members being generally equal in size and configuration and having longitudinal axes and adapted to be placed in side-by-side relation, said measuring tape being adapted to be folded about said first and second plate members in a manner to retain them in said side-by-side relation, said guide means being disposed generally centrally of and transverse to the longitudinal axis of said second plate member, said guide means comprising a guide tunnel through which said measuring tape is slidable, said registration means comprising an edge portion of said guide tunnel which overlies said measuring tape and provides an indication of the distance between said second plate member and the point of attachment of said measuring tape to said first plate member, said first and second plate members being manipulatable to facilitate measurement of a person's height, relative blowing strength, and relative flexion, said first plate member having indicia thereon indicating where a person's feet are to be placed when using said system to measure the person's height, such that movement of said second plate member to a position generally flat against the top of the person's head will indicate the dimensional height of the person by observing the dimensional indicia on said measuring means immediately underlying said registration means of said guide means.

3. A system for use in measuring growth and health characteristics and the like, comprising, in combination, a first generally flat plate member adapted to be placed in a generally flat position on a horizontal surface, an elongated flexible measuring tape having one end attachable to said first plate member and having dimensional indicia therealong increasing in magnitude from said end attachable to said first plate member, and a second generally flat plate member having guide means thereon cooperable with said elongated measuring tape in a manner to facilitate movement of said second plate member along the length of said measuring tape, said guide means defining registration means cooperable with said measuring tape to indicate the distance between said second plate member and the point of attachment of said one end of said measuring tape to said first plate member, said first and second plate members being generally equal in size and configuration, said guide means being disposed generally centrally of and transverse to the longitudinal axis of said second plate member, said guide means comprising a guide tunnel through which said measuring tape is slidable, said registration means comprising an edge portion of said guide means which overlies said measuring tape and provides an indication of the distance between said second plate member and the point of attachment of said measuring tape to said first plate member, said first and second plate members being manipulatable to facilitate measurement of a person's height, relative blowing strength, and relative flexion, said second plate member having at least one pocket formed thereon adapted to receive a booklet upon which may be recorded health data or which may provide instructional material for use of said system.

* * * * *